June 26, 1928.
P. E. WURFFLEIN
1,675,077
DRYING PROCESS AND APPARATUS
Filed June 17, 1925
2 Sheets-Sheet 1
Fig. 1,
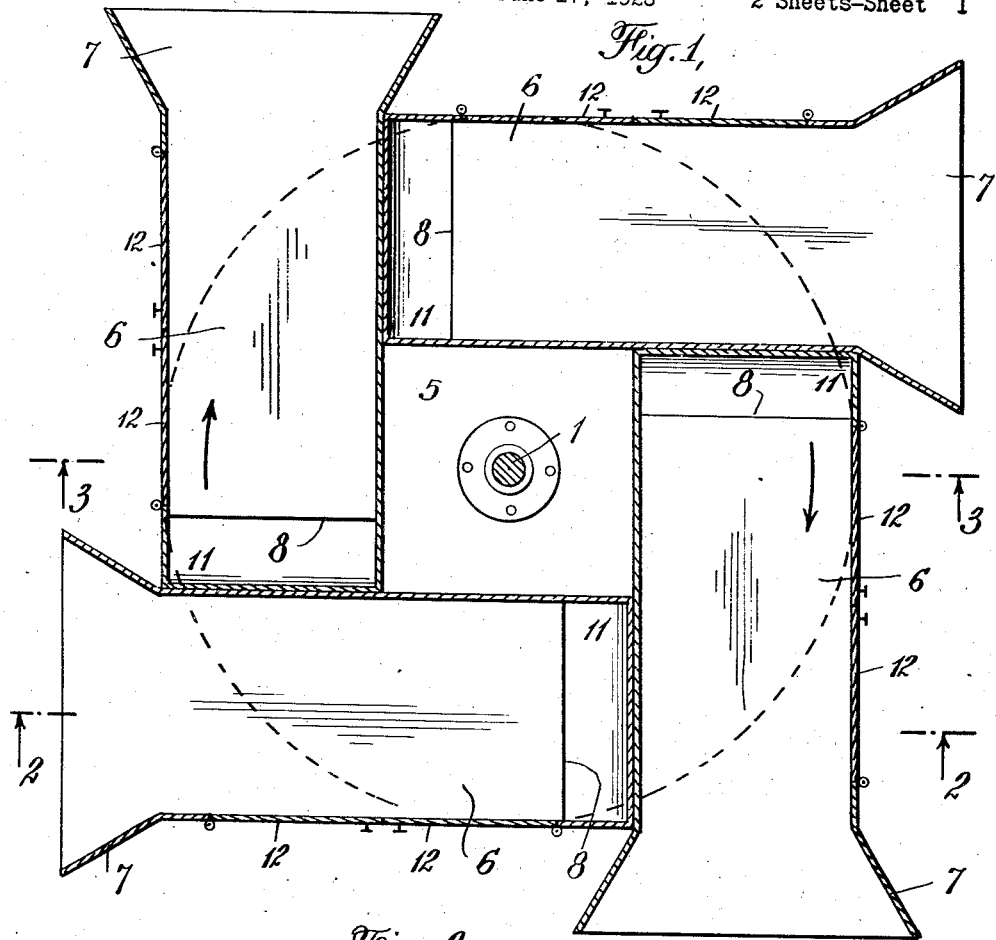
Fig. 2,
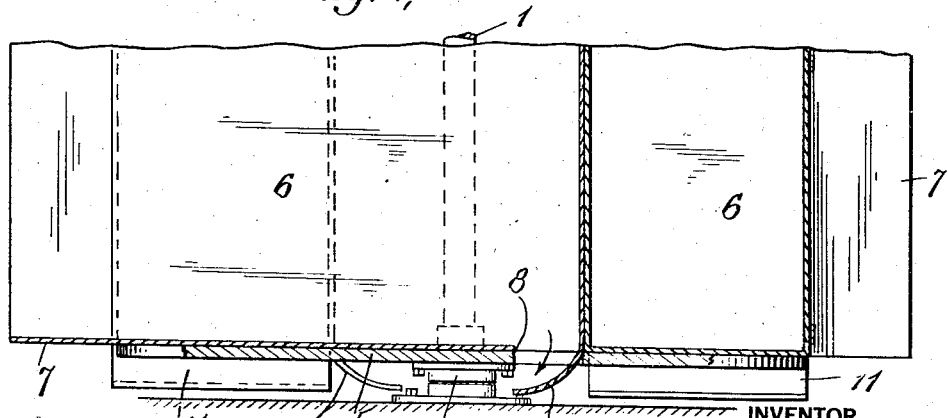
INVENTOR
Peter E. Wurfflein
BY
Pennie, Davis, Marvin and Edmonds
ATTORNEYS

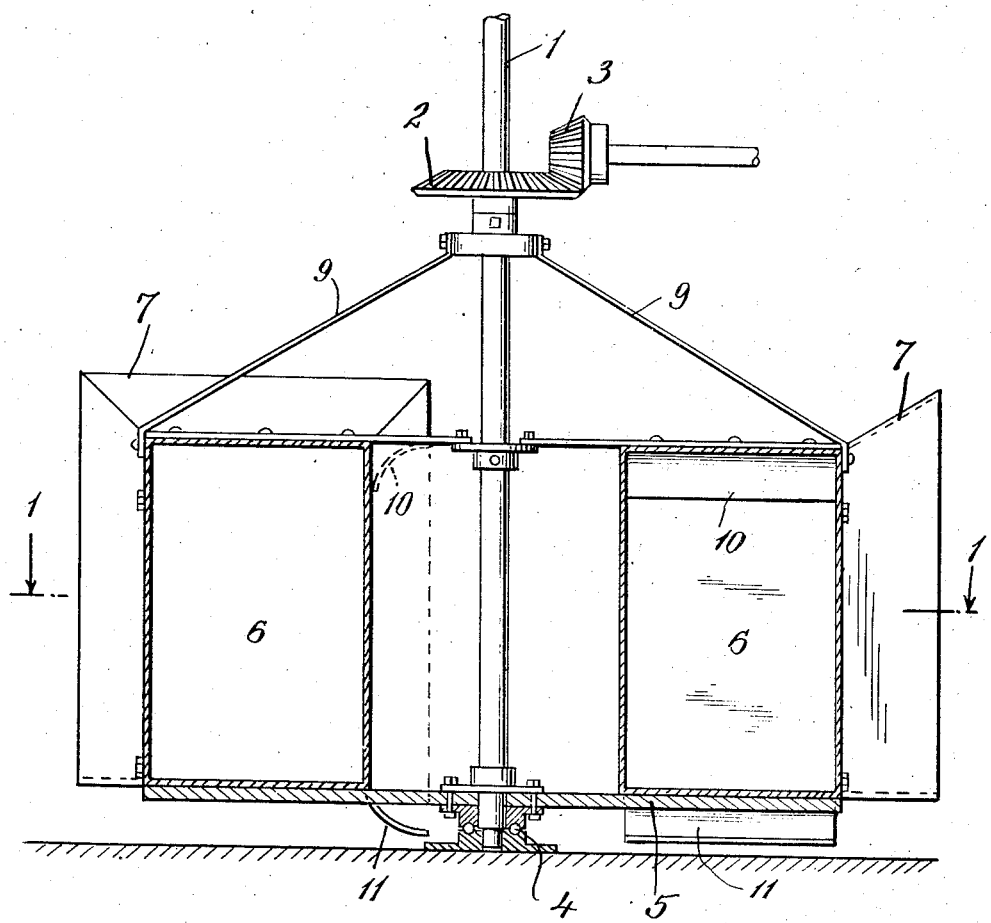

Patented June 26, 1928.

1,675,077

UNITED STATES PATENT OFFICE.

PETER E. WURFFLEIN, OF VINELAND, NEW JERSEY.

DRYING PROCESS AND APPARATUS.

Application filed June 17, 1925. Serial No. 37,607.

This invention relates to a process of drying amorphous materials and to an improved drying apparatus.

In my co-pending application Ser. No. 31,638, filed May 20, 1925, I have described a process of drying certain materials such as hides, ceramics, food-products, textiles, and the like by subjecting these materials to a large volume of warm air and simultaneously to the action of centrifugal force. I have also described in the same application a type of drier which may be used in the process and consists of drying chambers mounted on a rotating table and provided with curved scoops opening in the direction of rotation of the table and with exhaust openings in the floor of the drying chambers at their rear ends so that when the drier is rotated the scoops force a large volume of warm air over the material to be dried and out through the floor so that it is discharged axially.

I have found that it is possible to dry amorphous colloidal materials, such as peat, glue, gum-chicle and other gums, starch, gelatin, gluten, and the like. These materials have hitherto been very difficult to dry owing to the fact that the water is held tenaciously in colloidal solution and many of the substances are very sensitive to heat. For example, if gelatin is dried at too high a temperature, it is acted on chemically and no longer possesses the property of readily redissolving in cold water. Starch when dried too rapidly or at too high temperature is also partially decomposed and tends to form hard insoluble lumps in which form it is unsuitable for most uses. Similar difficulties are encountered with gluten and other amorphous powdery substances of similar chemical characteristics. The drying of gum chicle is also a very difficult matter owing to the colloidal character of the material and the fact that it tenaciously retains water. Chicle has hitherto been dried by slow processes requiring large equipment and a long time and naturally greatly increasing the cost of the product. I have found that by my improved process it is possible to dry chicle rapidly and effectively in a few hours with the production of an excellent product for the manufacture of chewing gum.

The drying of peat is also one of great difficulty, the only successful method hitherto used being the air-drying of peat which requires a long time and which does not completely dry the product, while at the same time involving a large labor cost. High temperature drying of peat has not proved to be successful owing to the tenacity with which peat retains water and to the disproportionate cost for heating necessary. I have found that partly air-dried peat or even peat fresh from the bog can be dried within a short time by the use of large volumes of warm air and centrifugal force.

I do not in the present application claim the drying of materials by means of warm air and centrifugal force broadly but on the contrary claim specifically as my invention the drying of amorphous colloidal materials and the improved construction of drier which will appear from a more detailed description given below.

The following detailed description of my improved drier taken in connection with the drawing and with the drying of amorphous colloidal material will further illustrate the invention but it should be understood that the invention is not limited thereto and particularly that the novel drier may be used in drying other materials such as for example materials mentioned in my co-pending application referred to above and further that the amorphous colloidal materials dried according to the present invention may be dried in any suitable type of drier which will provide a large volume of warm air and at the same time subject the material to the action of centrifugal force. The process is therefore not limited to the particular improved drier described in the present application but may be used for example in the scoop drier described in my prior application above referred to or in any other suitable type of drier employing large volumes of warm air and centrifugal force.

The process will be described in connection with the use of warm air, but it should be understood that other gases may be used where a product is to be dried but is very sensitive to oxidation, or for other reasons cannot be effectively dried in the presence of air. I prefer to dry most substances at atmospheric pressure but the invention is not limited thereto and I may use diminished pressure which may be in conjunction with an inert gas taking the place partly or wholly of air.

The improved drier of the present invention retains the advantages of the scoop drier described in my above mentioned copending application and in addition an improved circulation of air with lower power consumption and a greater drying space is provided. A plurality of drying chambers are arranged on a horizontally rotating table but instead of curved scoops these chambers are provided with flaring mouths forming straight scoops and drying flues. The discharge of air from the drying chambers occurs, as in the drier of my prior application, through openings in the floor in an axial direction.

The novel drier of the present invention will be described in greater detail in connection with the accompanying drawings in which—

Fig. 1 is a horizontal section;
Fig. 2 is a detailed vertical section along the line 2—2 of Fig. 1.
Fig. 3 is a section parallel to Fig. 2 along the line 3—3 of Fig. 1

1 is a vertical shaft provided with the gears 2 and 3 and the bearing 4. The shaft may be rotated by any suitable means, (not shown).

A circular platform 5 is mounted on the shaft 1 and carries a plurality of drying chambers 6 provided with flaring scoop mouths 7 and exhaust openings 8 in the floor at the rear of the drying chambers. The drying chambers may advantageously be braced by means of guy rods 9 from the central shaft.

Air is directed downward and out through the openings 8 by the deflector plates 10 and 11 (see Figs. 2 and 3).

The drier may be of any suitable size but I have found that a drier having a table about 25 to 30 feet in diameter is a very suitable size.

The operation of the drier will be described in the following specific examples illustrating the novel process of the present invention as applied to drying amorphous colloidal materials. It should be understood that the invention from the apparatus standpoint is not limited to the specific examples described, but may be used in drying other materials.

Example I.

Moist chicle is spread on trays or racks which may be advantageously combined in a unit and wheeled into the drying chambers through the doors 12. The doors are closed and the drier is started, the temperature in the drying room being maintained at about 80 to 120° F. and the air kept dry. The speed of rotation varies with the size of the drier and I have found for a 30 foot drier a speed of revolution of about 35 R. P. M. is very satisfactory, the peripheral speed of the scoop mouths being somewhat under 60 miles an hour. Larger driers require lower speeds of rotation and smaller driers a more rapid rotation. The drier is permitted to rotate for from 3 to 12 hours and the chicle is evenly and completely dried so that it can be at once used in the manufacture of chewing gum.

Example II.

Glue is spread out on flat trays or other large surfaces and charged into the drier and dried as in Example I for about 3–12 hours at about 80 to 120° F. The dried glue is not damaged by excessive heat and is yet completely and thoroughly dried so that it can be transported in a dry form without lumping and without objectionable decomposition. Various types of glue can be dried by this method, such as animal hide glue, fish glue, casein glue and the like.

Example III.

Gelatin is formed in sheets and charged into the drier in racks or trays. The drying is continued for about 3 hours at 80 to 120° F. and the gelatin is thoroughly and completely dried but is not injured by the heat and is readily soluble in cold water. Gelatin may also be dried in small flakes instead of in large sheets if desired.

Example IV.

Starch is dried as described above, being spread on shallow trays in a drying rack and charged into the drier. The drier is operated for about 3–12 hours at about 80 to 120° F. The starch dries to a smooth powder and is not lumpy or damaged by heat. As the starch is thoroughly dried even when in lump form it keeps without mildewing if not exposed to a moist atmosphere. Gluten and other similar starch-like substances can be dried in the same way, the time varying somewhat with the nature of the substance and the amount of water contained.

Example V

Peat is stacked in the form of sods into the drying chamber and may advantageously be arranged on a rack to provide for air coming in contact with all sides of the peat. The drying is carried out for some 6 to 24 hours at a temperature of from 80 to 120° F. The peat is dried down to a very low moisture content and can be used for briquetting, fertilizer and other purposes. Owing to the fact that the drying takes place at a very low temperature there is a minimum loss of nitrogenous substances which are volatile at higher temperatures and peat is therefore richer in nitrogen than when it is dried at a higher temperature or when it is exposed to long periods of time to air. The product is therefore of greater value as fertilizer, containing a larger proportion of nitrogen. Partially air-dried peat may be dried in a similar way either in the form of sods or after disintegration in a shredder or other disintegrating machine. The period of drying is shorter than with the wet peat and may range from 3 to 12 hours depending upon the amount of air-drying and the fineness with which the peat is subdivided. The sods of course dry much slower than does the disintegrated products.

The drier of the present invention is more effective than the drier described in my co-pending application referred to above as a larger amount of drying space is provided for the same size drier and the straight scoops present a lower resistance to the passage of air over the product to be dried which in turn results in a considerable saving in the amount of power required to run the machine.

A further important advantage of the present drier lies in the fact that the drying chambers are nearer the periphery of the rotating table and the centrifugal force exerted on the water in the material to be dried is considerably greater than in the type of drier described in my co-pending application where the drying chambers are arranged much nearer to the center of rotation.

I have found that the use of centrifugal force coupled with large volumes of air at relatively low temperature is a remarkably effective drying agent and makes it possible to dry such amorphous colloidal substances as those referred to above in the examples in a satisfactory manner which has hitherto not been possible except by the use of extremely long times and high temperature which seriously injuries some of the more delicate products. While the present drier is particularly effective in drying colloidal amorphous substances which retain water with great tenacity, it is also useful in drying easily injured delicate products such as hides, food-products, ceramics, textiles and similar products described in my co-pending application referred to above and can also be effectively used in drying fish, herbs and leaves such as for example peppermint, sage and the like and is generally useful and effective in drying materials which tend to retain water tenaciously and which are easily injured by the application of too high heat. The drying appears to be due to a considerable extent to the effect of centrifugal force forcing the water or other solvents to the surface of the particles of the material to be dried where it is easily picked up by the large volume of warm air passed over the materials to dry. I am not certain as to just how the centrifugal force operates to achieve the improved result in my process, but it is my opinion that the water is progressively driven out from the center as the materials to be dried dry in zones approximately concentric with the axis of rotation which would not be expected if centrifugal force did not have a marked effect on the drying process. In the absence of centrifugal force the material will tend to dry in zones from the scoop mouth toward the rear as the material nearer the mouth of course comes in contact with drier air than that toward the rear of the chamber.

The axial discharge of the air below the drying table is of great importance as the air after passing through the drying chamber is of course laden with moisture from the wet material being dried and it is advantageous to remove this air from the zone of the scoops so that it will not be recirculated over the material to be dried which would slow up the drying process.

The drying process of the present invention can be very efficiently carried out in the drier herein described, but it should be understood that the invention is not limited to a drier of the particular type here described and on the contrary any type of drier which will combine a large volume of warm air with centrifugal force can be employed. I have found however that the scoop drier described in my co-pending application and the improved scoop drier described in the present application are particularly suitable and effective for use in my process.

It will be seen that the drier of the present invention constitutes a simple and effective drier combining the effect of centrifugal force and large volumes of air with a minimum of power consumption and a maximum of drying space.

In the preferred apparatus illustrated in the drawings I have provided four drying chambers symmetrically arranged on the circular platform. I have found that this number of drying chambers can be effectively fitted and economically utilize the space. It should be understood however, that the invention is not limited to any particular number of drying chambers arranged on a rotating table nor to a single layer of drying chambers. Thus I may use any number of drying chambers arranged either in a single layer or if desired in a plurality of layers where a large number of separate small drying chambers is desired in a minimum of space. I have found that a smaller number of drying chambers than four do not utilize the space as effectively and but little is gained in greatly increasing the number.

The apparatus may be built of any suitable material and can be simply and ruggedly constructed of sheet metal and wood.

Where corrosive materials are to be dried special linings of the drying chambers may be provided.

I have illustrated a drier driven by bevel gears through a central shaft. It should be understood however that the invention is not limited to this particular type of drive and other types of drives such as a large ring gear on the rotating table engaging with a pinion may also be used. Other suitable modifications will be obvious to those skilled in the art.

I claim:

1. A rotating scoop drier comprising at least one drying chamber provided with a flaring intake throat forming a scoop and straight drying flue.

2. A rotating scoop drier comprising at least one drying chamber provided with a flaring intake throat forming with the chamber a scoop and straight drying flue and means for discharging the air after passing through the drying chamber at right angles thereto.

3. A drier comprising in combination, a rotating table, at least one drying chamber mounted thereon, said chamber having a flaring intake throat opening in the direction of rotation of the table and forming with the drying chamber a straight scoop and drying flue and means for discharging the air after passing through the drying chamber in an axial direction.

4. A drier comprising in combination a rotating table, at least one drying chamber mounted thereon, said chamber having a flaring intake throat opening in the direction of rotation of the table and forming with the drying chamber a straight scoop and drying flue and means for discharging the air after passing through the drying chamber downwardly in an axial direction.

5. A drier comprising a rotating table, at least one drying chamber mounted thereon and provided with a flaring intake throat comprising with the chamber a scoop and straight drying flue, said drying chamber having a closed rear end and provided with a downwardly extending opening at the rear.

6. A drier comprising a rotating table, at least one drying chamber mounted thereon and provided with a flaring intake mouth in the direction of rotation of the table and constituting with the chamber a straight scoop and drying flue, said chamber having a closed rear end and provided with an opening in the floor at the rear and a deflector plate beneath said opening.

7. A drier comprising a rotating table, at least one drying chamber mounted thereon and provided with a flaring intake mouth in the direction of rotation of the table and constituting with the chamber a straight scoop and drying flue, said chamber having a closed rear end and provided with an opening in the floor at the rear and a deflector plate above and beneath said opening.

8. A drier comprising in combination a rotating table, a plurality of drying chambers mounted thereon and provided with flared intake throats pointing in the direction of rotation of the table and forming with the chambers straight scoops and drying flues, and means for causing the air after passage through the drying chambers to discharge downwardly and axially.

9. A drier comprising in combination a rotating table mounted upon a central vertical shaft, means for imparting a rotating movement to said shaft, a plurality of drying chambers mounted on said table and provided with flared intake throats pointing in the direction of rotation of the table and constituting with the chambers straight scoops and drying flues and means for directing the air after passing through the drying chambers downwardly and axially.

10. An apparatus according to claim 1 provided with means for charging drying racks into the drying chamber as a unit.

In testimony whereof I affix my signature.

PETER E. WURFFLEIN.